(No Model.) 4 Sheets—Sheet 1.
A. WALRATH.
MACHINE FOR SEPARATING BROOM CORN.

No. 545,619. Patented Sept. 3, 1895.

Witnesses:
J. W. Fisher
Grace T. Many.

Inventor;
Alphonso Walrath
by Ward Cameron
Attorneys (No Model.) 4 Sheets—Sheet 3.

A. WALRATH.
MACHINE FOR SEPARATING BROOM CORN.

No. 545,619. Patented Sept. 3, 1895.

Witnesses:
J. W. Fisher
Grace T. Maug.

Inventor;
Alphonso Walrath
by Ward & Cameron.
Attorneys

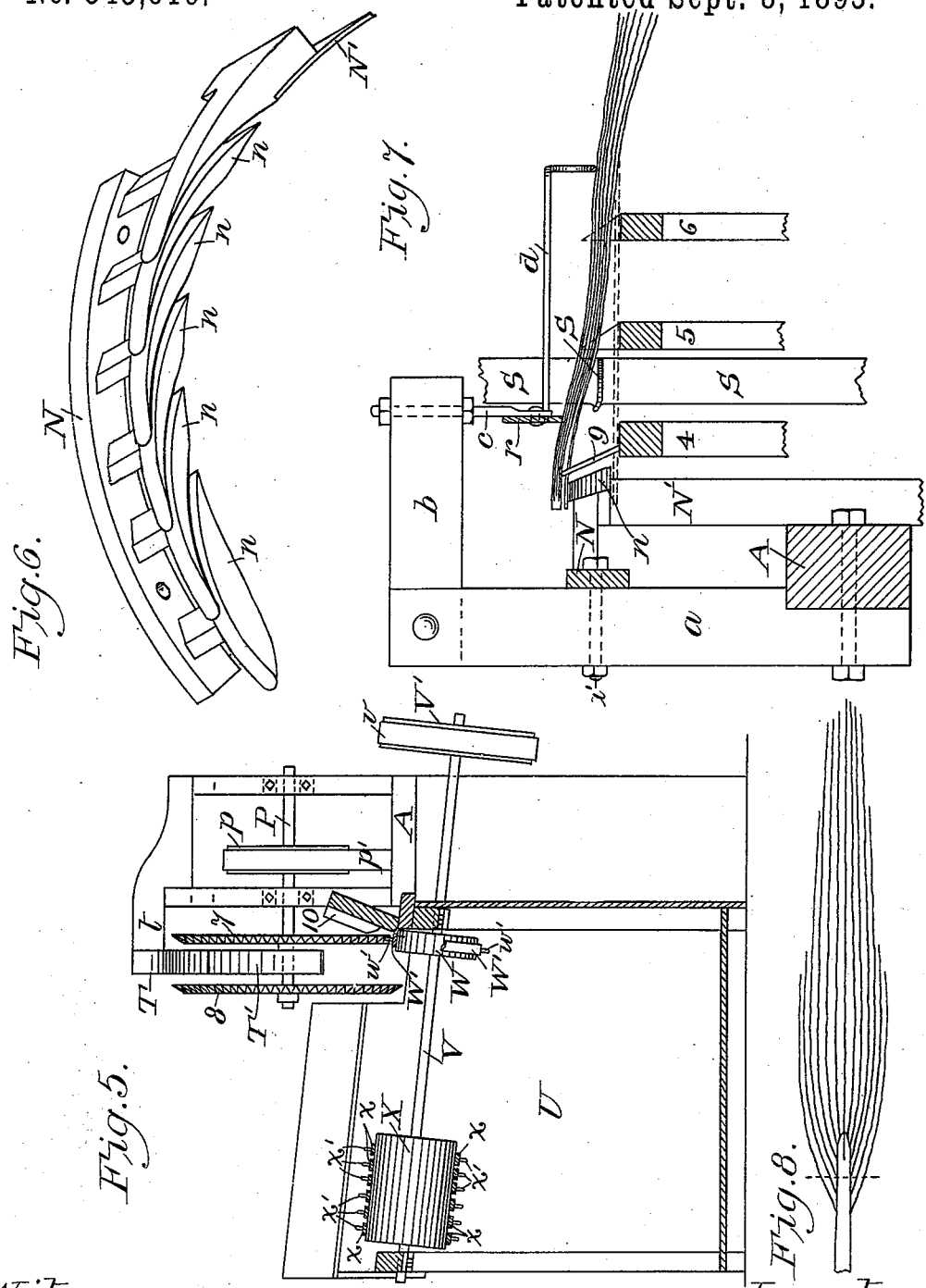

UNITED STATES PATENT OFFICE.

ALPHONSO WALRATH, OF FORT PLAIN, NEW YORK.

MACHINE FOR SEPARATING BROOM-CORN.

SPECIFICATION forming part of Letters Patent No. 545,619, dated September 3, 1895.

Application filed May 8, 1895. Serial No. 548,521. (No model.)

*To all whom it may concern:*

Be it known that I, ALPHONSO WALRATH, a citizen of the United States, residing at Fort Plain, in the county of Montgomery, State of New York, have invented a new and Improved Machine for Cutting and Separating Broom-Corn, of which the following is a specifiation.

My invention relates to machines for cutting the whisks of broom-corn and separating the short pieces from the stubs; and the object of my invention is to produce a cutting and separating machine by means of which the short pieces are gathered in a place separate from the stubs and the hurl are sorted, separated, and collected in separate receptacles or chamsbers. I attain this object by means of the mechanism illustrated in the accompanying drawings, in which—

Figure 1:
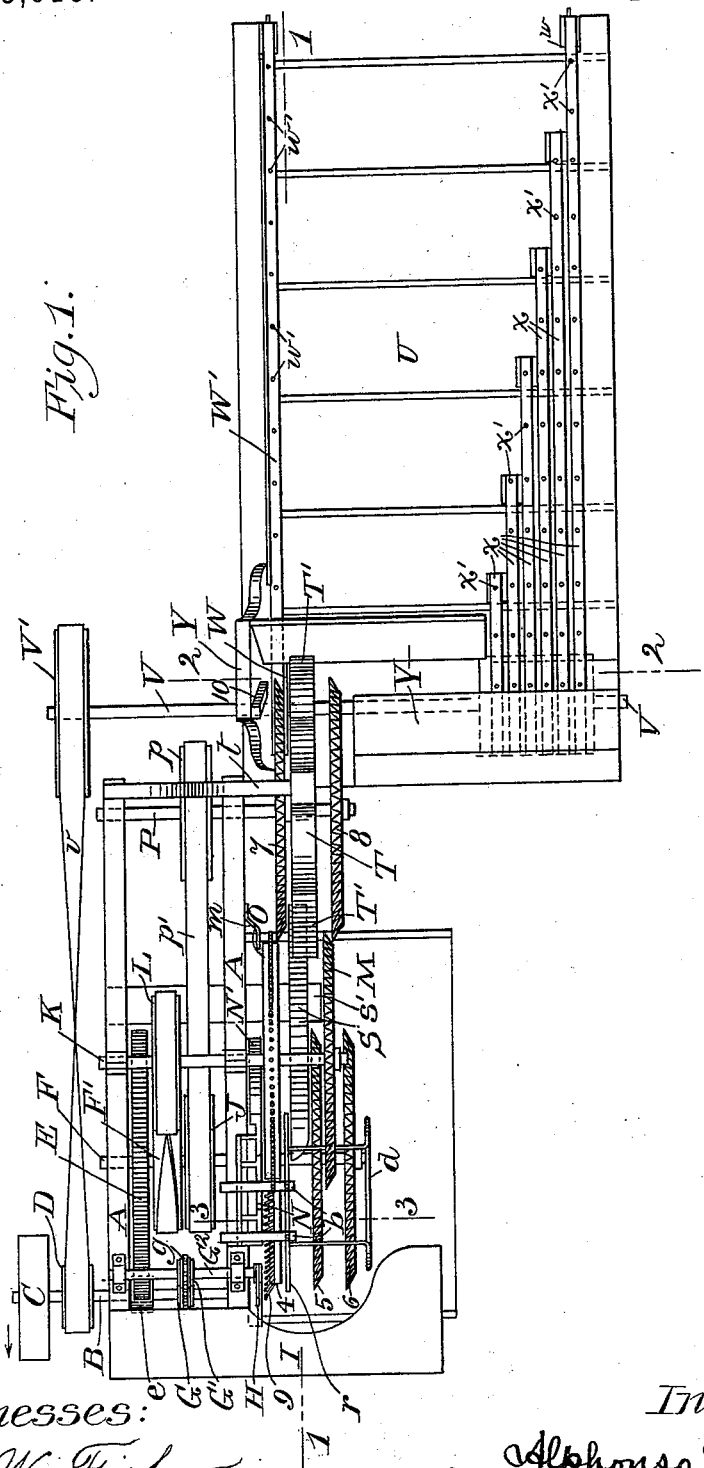
Figure 2:
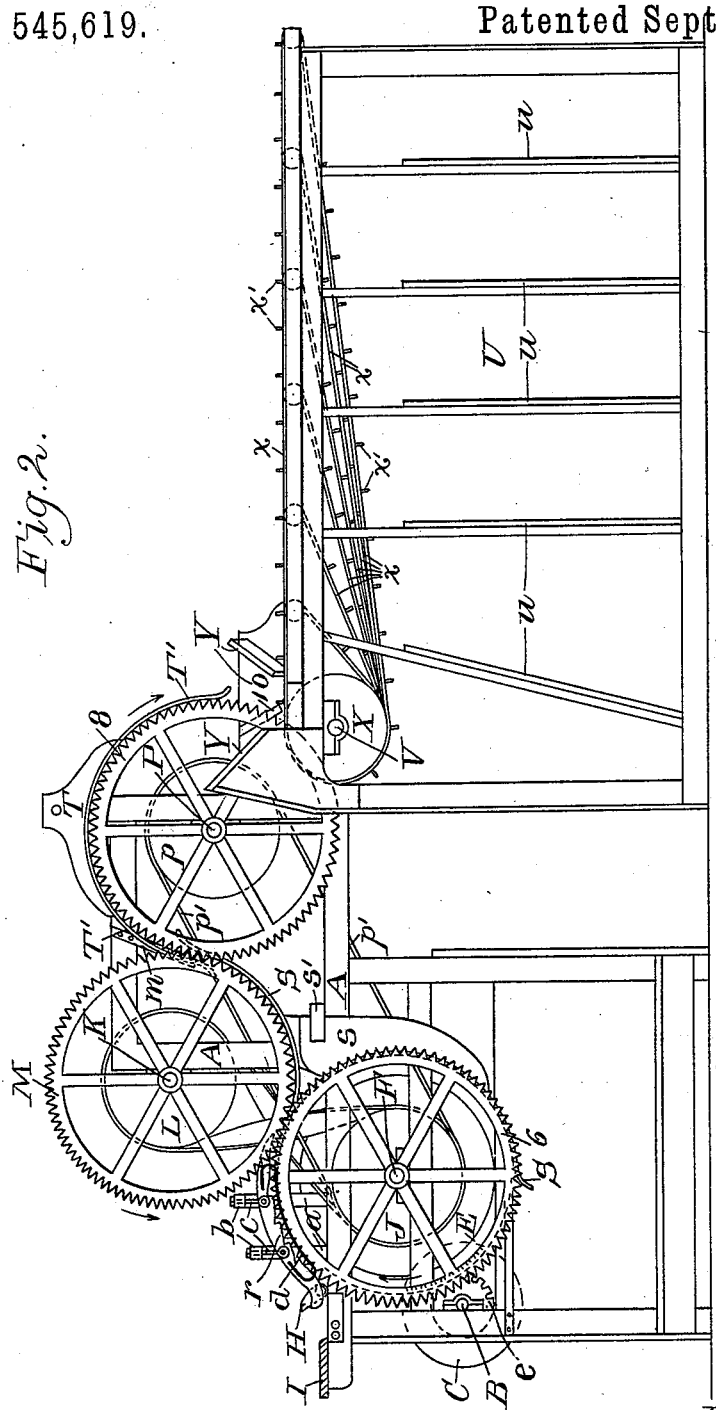
Figure 3:
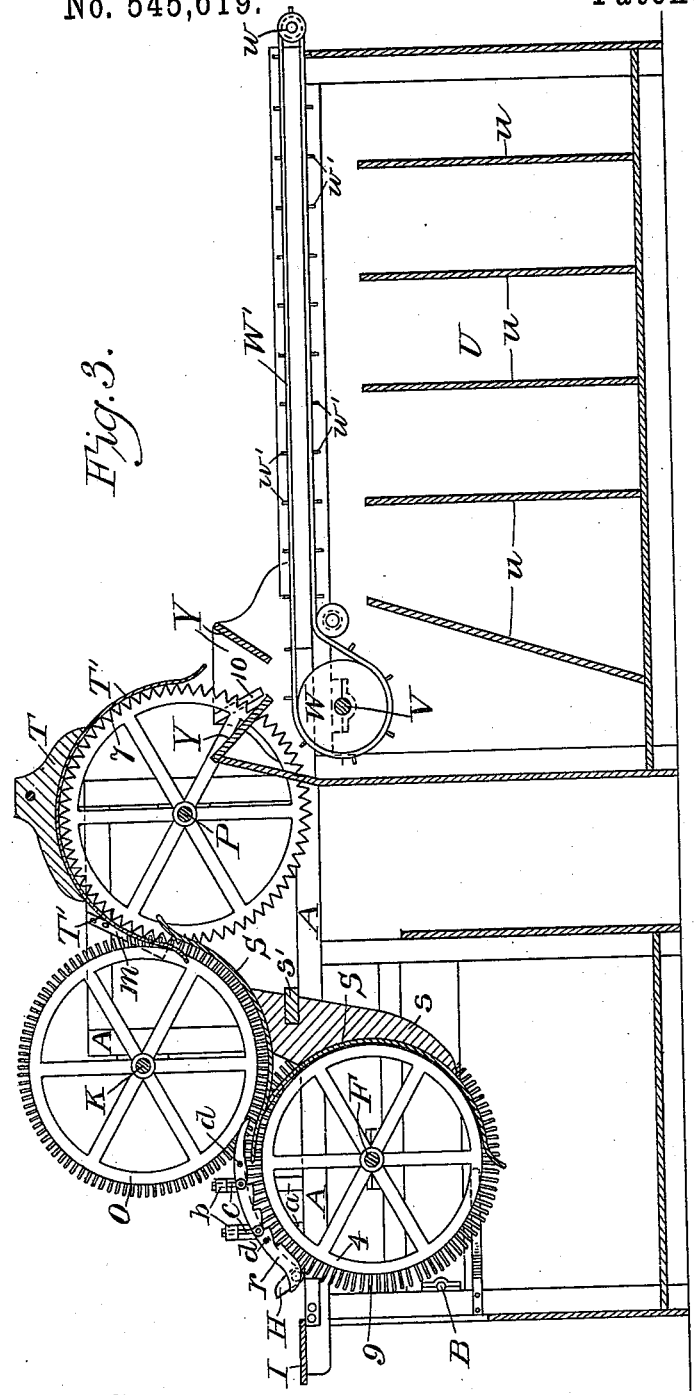
Figure 4:
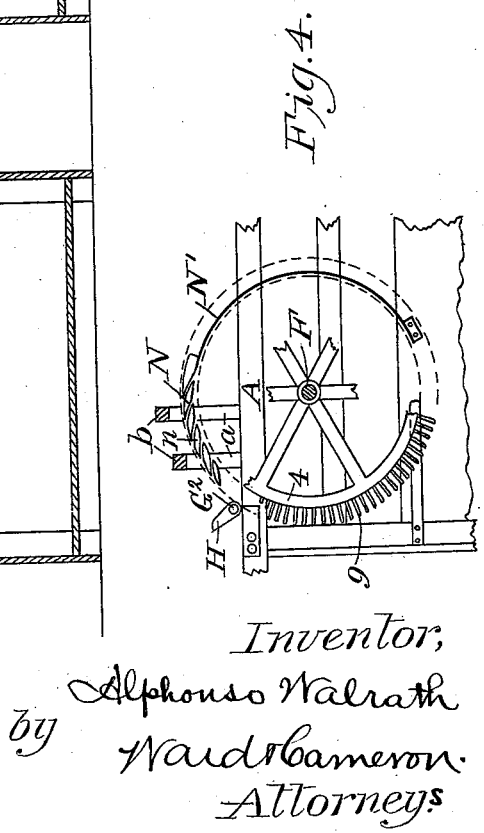

Figure 1 is a plan. Fig. 2 is a side elevation. Fig. 3 is a longitudinal section along the line 1 1 on Fig. 1. Fig. 4 is a detail sectional view of one of the stub-wheels, showing the position of the separator-guide. Fig. 5 is a cross-section along the line 2 2 on Fig. 1. Fig 6 is a perspective view of the separator-guide. Fig. 7 is a cross-section along the line 3 3 on Fig. 1, and Fig. 8 is a view of a whisk of broom-corn.

Similar letters and figures refer to similar parts throughout the several views.

To the frame A, I mount the shaft B, preferably placed in such position that one end thereof shall extend beyond the side of the frame, and upon which shaft I place the power-pulley C and the belt-pulley D. I also mount on the shaft B a gear $e$, which meshes with the toothed wheel E, mounted on a shaft F, which shaft is also suitably mounted in the frame A of the machine. The shaft B carries a sprocket-wheel G, which is connected by a sprocket-chain $g$ with a sprocket-wheel G' on the spindle $G^2$, to one end of which is a rotary knife H, which extends slightly above the table I, placed near one end of the machine and secured to the frame A, the spindle $G^2$ being suitably mounted on the top of the frame A. On the shaft F, I mount the belt-pulley F', the belt-pulley J, and the three wheels 4, 5, and 6. I also mount in the frame A a shaft K, which carries the belt-pulley L and the wheels M and O. The belt is placed around the pulley F' and twisted, and then placed about the pulley L, causing the wheels 4, 5, and 6 to revolve in a direction opposite to that of M and O. The shaft P mounted in the frame A carries the belt-pulley $p$ and the toothed wheels 7 and 8. The belt $p'$ passes over the pulley J and pulley $p$, causing the toothed wheels 7 and 8 to revolve in the same direction as the wheels 4 5 6.

The wheels 4 and O are provided with a series of studs placed about equidistant from each other along the periphery of each wheel, said wheels operating in connection with each other, but in opposite directions. The wheels 5 and 6 are provided with teeth along their peripheries.

To the frame A, I arrange the upright $a$, Fig. 7, to which I secure by bolt $a'$ or in any suitable manner a separator-guide N, which is provided with a series of feather-edge wedge-shaped pieces $n$ $n$, slightly curved downward and separated from each other, as shown in Fig. 6, and so adjusted that the ends of the straw that are detached from the studs will come between the strips $n$ and be forced between the studs 9 on the wheel 4. The function of the separator N is thus to direct the short pieces of the broom-corn into the space between the studs 9 on the wheel 4 and to cause them to be carried by the wheel 4 downward. At the lower end of the separator N, I arrange a guide N'. To the uprights $a$ I secure the arms $b$, to which I attach a brace $c$ in any suitable manner, which usually extends below the arm $b$, and to which I secure the notched curved guide $r$, which is placed at one side of the studded wheel 4, its function being to cause the ends of the short pieces of straw to be snapped into the space between the studs 9. To the notched guide $r$ is secured a wire guide $d$, which extends outward beyond the wheels 6 and 5, and is bent downward and horizontally, extending a short distance, and then a return bend is made on itself and extends backward to the curved guide $r$, so arranged as to rest upon the straw extending beyond the wheel 6 and holding the same in contact with the teeth on the wheels 5 and 6.

For the purpose of holding the straw in contact with the wheels I arrange a metallic guide S, which is placed between the wheels 4 and 5 and the wheels O and M, and which guide is secured to the block s, attached to the cross-piece s', secured to the frame A, the guide S having a portion curved downward conforming to the contour of the wheels 4 and 5 and a portion curved upward conforming to the contour of the wheels M and O, the function of the lower portion being to direct the short pieces of straw, which are in contact with the studded wheel 4, close to the periphery of the wheel, to the bottom of the frame and to carry the longer pieces, those attached to the stub, in contact with the upper wheel M toward the top of the machine. Secured to the bracket T, attached to the projection t, on the frame A, I arrange a metallic guide T', operating in connection with the wheel 8, which has for its function the keeping of the straw in contact with the toothed wheels 7 and 8 in its passage from the wheels M and O. For the purpose of loosening the straw from the wheel O and bringing it in contact with the wheel 7 I arrange a clearer m, secured to the frame A near the point of connection between the two wheels 7 and O.

To the rear of the frame A, I arrange a box U, having within it a series of partitions u u, and across the upper portion of the box I mount the shaft V, to which is mounted a belt-pulley V', connected by the twisted belt v with the belt-pulley D on the shaft B, on which shaft V, I also mount, near one edge of the box, the belt-pulley W, which carries a belt W', extending the length of the box, where it passes over a sheave w and returns to the pulley W, the belt W' being provided with a series of projections w' w' along its length. The shaft V also carries a belt-pulley X near the opposite edge of the interior of the box U, around which belts x x are placed, and which pass over sheaves mounted immediately above the partitions u u, respectively, and which belts are also provided with the projections x' x', similar to those on the belt W'. Immediately in front of the wheels 7 and 8 and extending across the box U, immediately above the belts W' and x x, I place the bottomless trough Y, having sides and ends converging slightly, the ends being preferably covered with metal to reduce friction. I also arrange, in connection with the end of the box U, by the side of the wheel 8, a clearer 10, which has for its object the disengaging of the straw from the teeth of the wheel, causing it to fall within the trough Y.

The operation of my machine is as follows: A whisk of straw similar to that shown in Fig. 8 is placed on the table I and cut by the knife H, usually as shown by dotted lines in Fig. 8, when the short pieces will come in contact with the separator N and the studs 9 on the wheel 4, and by the operation of the wheel 4 will be drawn against the separating-piece n of the separator N, and thus forced close to the periphery of the wheel. The straw attached to the stub will be on the top of the studs 9 and will also be in connection with the teeth of the wheels 5 and 6. As the wheels continue to revolve, the straw will be brought in contact with the guide S, and those that are short and separated from the stubs will pass beneath the lower portion of the guide S and be conducted to the bottom of the frame beneath the wheels 5 and 6, where they will become disengaged, while those attached to the stub being nearer the ends of the studs will pass above the guide S and be carried in contact with the wheels M and O upward until they meet the wheel 8. They will then be carried in connection with wheel 8, held in position therein by the guide T', until they reach the trough Y, when they will fall into the trough extending across or partly across the same in accordance with their length. They will fall upon the belts toward the rear of the box, the short ones falling into those nearest the trough, the long ones being carried to the end of the box, and there is thus placed between the partitions of the box the various sizes of straw.

What I claim as my invention, and desire to secure by Letters Patent, is—

1. In a machine for cutting, separating and sorting broom hurl, the combination of a frame a rotary knife suitably mounted, a means for imparting motion to said knife, a series of wheels mounted and adapted to operate on a shaft adjacent to said knife, a series of studs adjusted in the periphery of one of said wheels, a separator suitably mounted adapted to engage the short pickings and conduct them between said studs close to the periphery of said wheel, a curved notched guide mounted above said wheels adapted to bend and snap the hurl in connection with toothed wheels, with a guide attached to the lower end of said separator, with a series of wheels suitably mounted operating in connection with those above referred to, but revolving in an opposite direction, with a third series of wheels suitably mounted revolving in the direction of the first mentioned wheels, with a suitable guide placed between the first and the second series of wheels by the operation of which the hurl is caused to follow the second set of wheels and the pickings follow the first set of wheels, with a guide arranged to conduct the hurl from the second set of wheels to the third set, with suitable clearers causing the straw to be detached from the wheels, a bottomless trough into which the hurl is deposited after clearance from the third set of wheels, a belt suitably mounted extending along the edge of a sorting box, a series of transverse partitions in said sorting box, a series of short belts running along the opposite edge of said sorting box and extending from said trough to each division of the sorting box respectively, with a series of upwardly projecting pins arranged in each of said belts, substantially as described and for the purpose set forth.

2. In a machine for cutting, separating and sorting broom hurl, a frame in combination with a suitable knife, a means for imparting motion thereto, with a series of wheels suitably mounted and adapted to carry the hurl and pickings, the wheel nearest said knife provided with studs along its periphery, a series of feather edge wedge shaped strips secured a slight distance from each other and arranged to conform to the contour of said wheel and provided at its lower end with a projecting guide forming a separator and mounted adjacent to one of said wheels, said separator operating to conduct the pickings, after the straw has been cut, between the studs on said wheel and retain them close to the periphery of the wheel and prevent them from being sprung away therefrom by the operation of the machine, substantially as described and for the purpose set forth.

3. In a machine for cutting, separating and sorting broom hurl, a frame, a suitable knife mounted therein, with means for imparting motion thereto, a series of wheels mounted in said frame and adapted to carry the straw after having been operated upon by said knife, a second series of wheels mounted above the first mentioned series of wheels and arranged to carry the hurl from said first mentioned wheels after the pickings have been separated therefrom, with a third series of wheels mounted in said frame operating in connection with said second series of wheels and arranged to conduct the hurl from said second series of wheels upward and over said third series of wheels dropping the hurl therefrom into a suitable receptacle, with means for clearing each of said set of wheels of the straw, substantially as described and for the purpose set forth.

ALPHONSO WALRATH.

Witnesses:
GRACE T. MANY,
FREDERICK W. CAMERON.